(12) United States Patent
Haze

(10) Patent No.: US 6,597,764 B1
(45) Date of Patent: Jul. 22, 2003

(54) COMMUNICATION DEVICE WITH MAIN TELECOMMUNICATION UNIT THAT ALLOWS DESIGNATION OF A SELECTED SUBSIDIARY TELECOMMUNICATION UNIT

(75) Inventor: Toshiro Haze, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/216,744

(22) Filed: Dec. 21, 1998

(30) Foreign Application Priority Data

Dec. 22, 1997 (JP) .............................. 9-352572
Oct. 27, 1998 (JP) ........................... 10-304843

(51) Int. Cl.[7] .............................................. H04M 1/64
(52) U.S. Cl. ................................ 379/88.01; 379/88.12; 379/88.18; 379/88.22; 379/207.08; 379/211.01
(58) Field of Search ........................... 379/67.1, 70, 76, 379/80, 82, 88.01–88.04, 88.13, 142.07, 167.01, 167.08, 171, 172, 911, 907, 102.01, 102.02, 102.07, 164, 165, 173, 422, 423, 88.22–88.25

(56) References Cited

U.S. PATENT DOCUMENTS

| | | | | |
|---|---|---|---|---|
| 4,922,519 A | * | 5/1990 | Daudelin | 379/112 |
| 5,528,666 A | * | 6/1996 | Weigand et al. | 379/58 |
| 5,768,356 A | * | 6/1998 | McKendry et al. | 379/201 |
| 5,771,453 A | * | 6/1998 | Haartsen | 455/449 |
| 5,809,111 A | * | 9/1998 | Matthews | 379/31 |
| 5,892,814 A | * | 4/1999 | Brisebois et al. | 379/88.24 |
| 5,904,013 A | * | 5/1999 | Greenspan et al. | 379/211.04 |
| 6,052,442 A | * | 4/2000 | Cooper et al. | 379/88.19 |
| 6,178,230 B1 | * | 1/2001 | Borland | 379/67.1 |
| 6,198,947 B1 | * | 3/2001 | Barber | 379/88.02 |

* cited by examiner

Primary Examiner—Fan Tsang
Assistant Examiner—Ovidio Escalante
(74) Attorney, Agent, or Firm—Oliff & Berridge, PLC (57) ABSTRACT

A facsimile machine includes a main telephone and a plurality of cordless telephones. The facsimile machine transmits telephone selection information to a caller. Based on the telephone selection information, the caller then verbally selects one of the cordless telephones to be rung. A voice recognition unit analyses the caller's verbal input to determine the caller's selection. Based on the determination by the voice recognition unit, a ringing command signal is transmitted to the cordless telephone selected by the caller. With this configuration, only the cordless telephone designated by the caller is rung. Because the user can select a cordless telephone verbally, anyone can accurately let a particular cordless telephone be rung without the need to perform complicated operations.

4 Claims, 7 Drawing Sheets

| | NUMBER OF RINGING | RINGING |
|---|---|---|
| MAIN TELEPHONE | 4 | 0 |
| CORDLESS TELEPHONE 1 | — | 1 |
| CORDLESS TELEPHONE 2 | — | 1 |
| CORDLESS TELEPHONE 3 | — | 1 |
| CORDLESS TELEPHONE 4 | — | 1 |

FIG.8

| RINGING PATTERN | VOICE PATTERN DATA |
|---|---|
| 2 | A (PERSON) |
| 2 | B (PERSON) |
| 2 | C (PERSON) |
| 1 | D INC. (COMPANY) |

COMMUNICATION DEVICE WITH MAIN TELECOMMUNICATION UNIT THAT ALLOWS DESIGNATION OF A SELECTED SUBSIDIARY TELECOMMUNICATION UNIT

BACKGROUND OF THE INVENTION

1. Field of the Invention

The present invention relates to a communication device and in particular to a telephone or facsimile machine that is provided with a plurality of telecommunication units and that uses a telephone circuit as a transmission pathway.

2. Description of Related Art

Telephones, facsimile machines, and other communication devices that use telephone lines as a transmission pathway have recently been provided with a plurality of telecommunication units, that is, a main telephone connected directly to the telephone line, and one or more sub-telephones of cordless type that is capable of performing wireless communication with the main telephone.

Whenever the main telephone receives a ringing signal from a remote device over the telephone line, the main telephone transmits the ringing signal to all the sub-telephones. Accordingly, the main telephone and all the sub-telephones ring accordingly. A telephone connection is made when one of the main telephone or sub-telephones is brought into an off-hook condition.

The main telephone and each of the sub-telephones of such a system can be installed in separate rooms. In this case, when a caller calls the system, all of the system telephones (i.e., the main telephone and the sub-telephones) ring. Someone near one of the telephones answers the call and asks the caller whom he or she wishes to speak to. If the caller wishes to speak to the user, then the caller and the user can have a conversation. However, if the caller wishes to speak to someone besides the user, then the user goes to fetch the desired party or transfers the call to another one of the system telephones.

SUMMARY OF THE INVENTION

When each of the system telephones is installed in a different room, the user of a particular telephone is usually the person most often in the room. For example, when a telephone system is installed in a family home, then the son will usually answer the telephone installed in the son's room. When a telephone system is installed in an office environment, then the manager will usually answer the telephone installed in the manager's office.

If a caller could designate which system telephone to ring, then by ringing the system telephone installed in the room of the desired party, the caller would have a good chance that the desired party would answer the call, so that the caller could immediately start a conversation with the desired party. However, since all system telephones ring as described above, it is more likely that someone other than the desired party will answer the call. Therefore, the caller will have to wait while the user goes to fetch the person whom the caller has wished to speak to or else transfers the call to the appropriate system telephone.

It is therefore an objective of the present invention to overcome the above-described problems and to provide an improved communication device that enables the caller to easily call a desired telephone and accurately call a person he or she wishes to speak to.

In order to attain the above and other objects, the present invention provides a communication device, comprising: a plurality of telecommunication units; selection information transmission means for transmitting selection information to a caller via a communication circuit after the communication circuit is connected, the selection information being for urging the caller to verbally input information indicative of his/her desired telecommunication unit; voice recognition means for recognizing the caller's verbally-inputted information; and selection calling means for selecting at least one telecommunication unit based on the recognized result and for transmitting a ringing signal to the selected telecommunication unit.

With the above-described structure, the caller can receive the selection information that urges the caller to select his/her desired telecommunication unit. The caller can verbally input information indicating his/her desired telecommunication unit. The verbally-inputted information is recognized by the voice recognizing means. The selection calling means transmits a ringing signal to the telecommunication unit that is selected based on the recognized result. The caller can therefore call only the telecommunication unit, with which the caller desires to communicate. Because the caller can verbally select his/her desired telecommunication unit, any caller can call his/her desired telecommunication unit reliably without performing any complicated operations. Because the caller can call his/her desired telecommunication unit only, it is possible to prevent persons other than a person, with whom the caller wishes to communicate, from answering the caller's call.

The selection information transmission means may be prevented from performing its operation until the predetermined number of ringing signals are received via the communication circuit. With this structure, a predetermined telecommunication unit may be rung until the predetermined number of ringing signals are received. When no answer is inputted at the predetermined telecommunication unit, an optional telecommunication unit will be selected by the caller next to ring. Thus, the predetermined telecommunication unit can be rung before the caller's selected telecommunication unit is selected to ring.

When the caller fails to verbally input information as recognizable by the communication device, a ringing signal may be transmitted to either one of a predetermined telecommunication unit and all the telecommunication units so that the predetermined telecommunication unit or all the telecommunication units will ring. Accordingly, at least some person at the receiving side can answer the call and communicate with the caller.

When no answer is inputted to the selected telecommunication unit by the time the predetermined number of ringing signals are transmitted thereto, a ringing signal may be transmitted to either one of a predetermined telecommunication unit and all the telecommunication units so that the predetermined telecommunication unit or all the telecommunication units will ring. Accordingly, at least some person at the receiving side can answer the call at some telecommunication unit.

At least one telecommunication unit, to which a ringing signal is to be transmitted when the caller's verbally-inputted information is not recognized, may be previously designated. The receiving side is thus prepared to reliably receive calls from callers. The communication device can perform operation suitable for the user's actual using state.

At least one telecommunication unit, to which a ringing signal is to be transmitted when no answer is inputted at the selected telecommunication unit by the time the predetermined number of ringing signal is transmitted, may be previously designated. The receiving side is thus prepared to reliably receive calls from callers. The communication device can perform operation suitable for the user's actual using state.

When the caller's verbally-inputted information is not recognized, the selection information transmission can be repeatedly performed until the verbally-inputted information will be successfully recognized. The caller can reliably select his/her desired telecommunication unit. Because the caller is informed that his/her verbally-inputted information is not recognizable, the caller can be warned to is try inputting his/her voice in a state more recognizable.

When no answer is inputted by the time the predetermined number of ringing signals is transmitted to the caller's selected telecommunication unit, the caller's desired specific process may be selected out of a plurality of subsequent processes to be executed. Accordingly, a process appropriate for the present situation can be achieved.

When no answer is inputted by the time the ringing signal is transmitted to the caller's selected telecommunication unit the predetermined times, another telecommunication unit desired to be rung next may be optionally selected, and a ringing signal be transmitted to the other telecommunication unit. Even when the person, with whom the caller desires to communicate most, is not available, the caller can optionally select another person, with whom the caller desires to communicate next, and can call that person.

When no answer is inputted by the time the ringing signal is transmitted to the caller's selected telecommunication unit the predetermined number of times, all the telecommunication units may be called next. At least some person at the receiving side can answer the call at some telecommunication unit.

When no answer is inputted by the time the predetermined number of ringing signal is transmitted to the caller's selected telecommunication unit, the caller can record his/her voice message to a voice storage area allocated for the selected telecommunication unit. A user that generally uses the selected telecommunication unit will thereafter reproduce the recorded message, thereby knowing the caller's message content.

Predetermined information may be transmitted to a previously-designated external communication device after the predetermined number of ringing signal is transmitted to the selected telecommunication unit. Even when a user that generally uses the selected telecommunication unit can not presently answer the call at the present communication device, the user will reliably know by the external communication device that a call has been transmitted from the caller. The user can immediately communicate with the caller if necessary.

When each telecommunication unit can output a plurality of different ringing sounds, data of the plurality of ringing patterns may be prestored in correspondence with a plurality of recognition patterns. When the caller verbally inputs information recognizable by the voice recognizing means as a recognition pattern, a ringing signal, indicative of a ringing sound corresponding to the recognition pattern, may be transmitted to the selected is telecommunication unit so that the ringing sound corresponding to the recognition pattern will be sounded at the selected telecommunication unit. When listening the ringing sound rung at the selected telecommunication unit, the user can speculate who is the caller according to the sounded ringing. This is convenient for the user.

The plurality of telecommunication units may include: a main telecommunication unit that is connected to the communication circuit, the selection information transmission means connecting the communication circuit before transmitting the selection information to the caller via the communication circuit; and at least one subsidiary telecommunication unit that can communicate with the main telephone.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A facsimile system according to preferred embodiments of the present invention will be described while referring to the accompanying drawings wherein like parts and components are designated by the same reference numerals to avoid duplicating description.

[First Embodiment]

A facsimile system according to a first preferred embodiment will be described below with reference to FIGS. 1 through 3.

Figure 1:
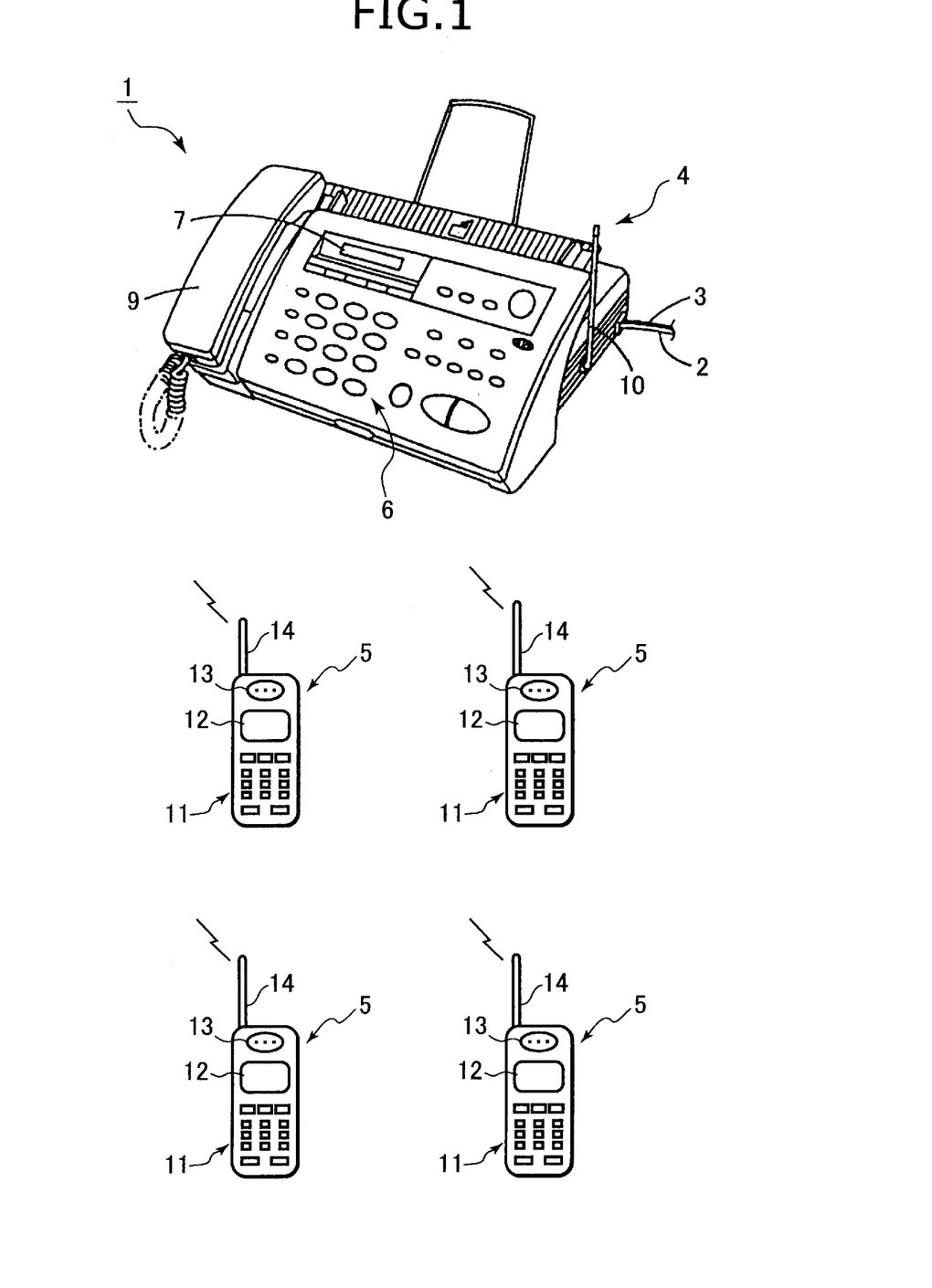
FIG. 1 is a perspective view showing a facsimile machine including five system telephones according to embodiments of the present invention.

FIG. 1 is a schematic view showing overall configuration of a facsimile system 1 according to a first embodiment of the present invention. As shown in FIG. 1, the facsimile system 1 includes five system telephones, that is, a main telephone (main telecommunication device) 4 and four sub-telephones of cordless type (subsidiary telecommunication devices) 5.

The main telephone 4 is connected to external transmission lines, that is, a digital transmission network 3 and a normal commercial analog telephone line 2. The main telephone 4 is capable of performing various facsimile functions, normally performed by facsimile machines, such as a document scanning function, a facsimile transmission/reception function, and printing function. The main telephone 4 is also capable of performing various telephonic functions, normally performed by telephones, such as an answering machine function and a main telephone function. It is noted that the main telephone function enables the main telephone 4 to perform wireless communication with the sub-telephones (cordless telephones) 5. More specifically, the main telephone 4 can wirelessly transmit a predetermined ringing command as a ringing command signal to the cordless telephones 5 and can perform wireless communication with the cordless telephones 5.

As shown in FIG. 1, the main telephone 4 includes an operation portion 6 for enabling a user's key input, a display portion 7 formed from a liquid crystal display, a handset 9 having a speaker and a microphone, and an antenna 10 for performing wireless communication with the cordless telephones 5.

The four sub-telephones 5 are capable of performing wireless communication with the main telephone 4. Each sub-telephone 5 is of a cordless type that is provided with no code, but that is powered by a battery mounted therein. As shown in FIG. 1, each cordless telephone 5 includes an operation portion 11, a display portion 12, a speaker 13, a microphone (not shown), and an antenna 14 for enabling wireless communication with the main telephone 4.

Figure 2:
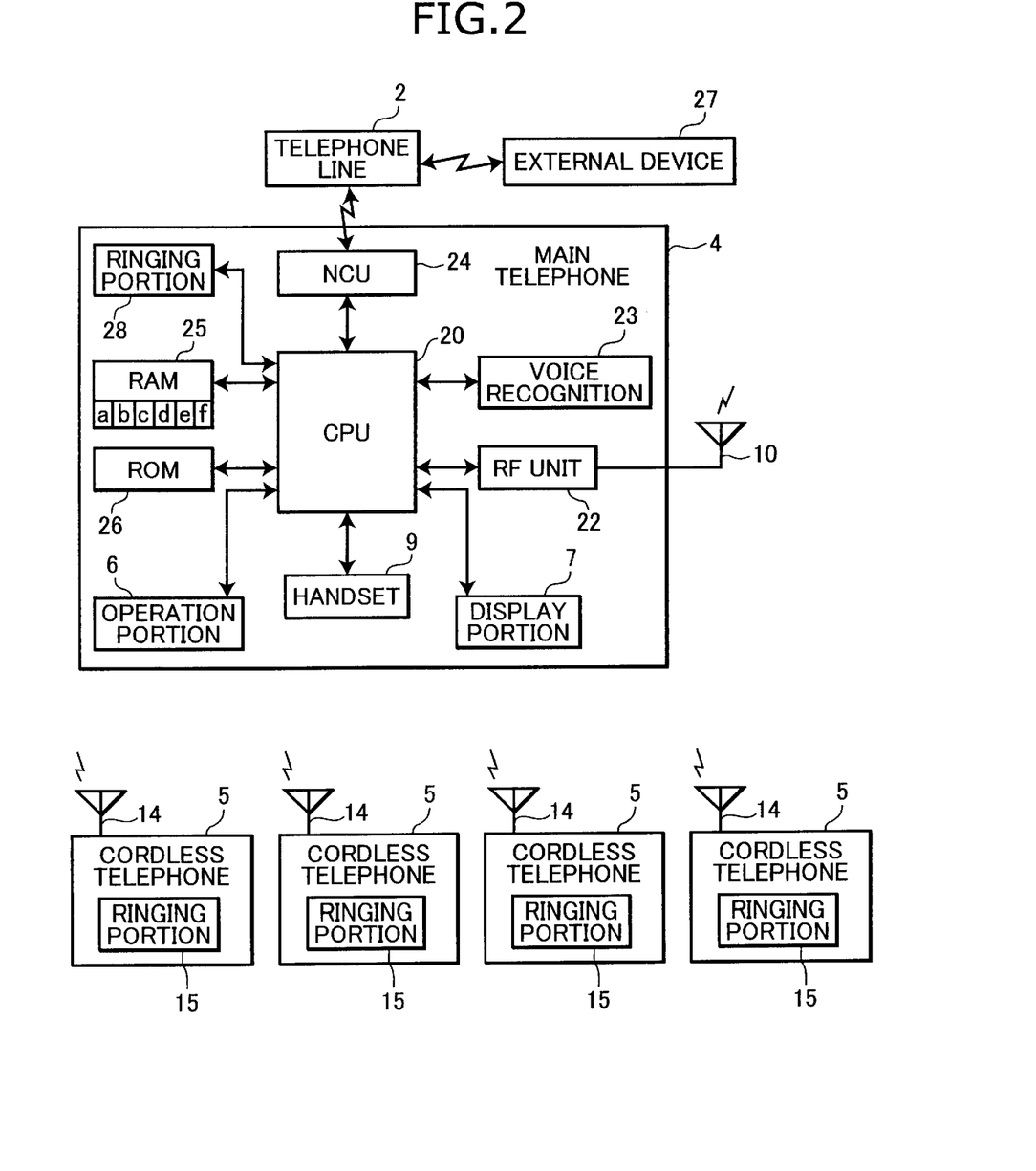
FIG. 2 is a block diagram showing connection between electrical components of the facsimile machine of FIG. 1.

FIG. 2 is a block diagram showing a control system of the facsimile system 1. As shown in FIG. 2, the control system includes a CPU 20 connected with the handset 9, the operation portion 6, the display portion 7, an RF unit (Radio-Frequency unit) 22, a ringing portion (ringing circuit) 28, a voice or speech recognition unit 23, a network control unit (NCU) 24, a RAM 25, and a ROM 26, wherein the CPU 20 controls these different components. The CPU 20, the RF unit 22, the ringing portion 28, the voice recognition unit 23, the network control unit (NCU) 24, the RAM 25, and the ROM 26 are mounted inside the main telephone 4 together with the handset 9, the operation portion 6, and the display portion 7.

The CPU 20 serves to control the entire telephone 4. The CPU 20 also serves to produce the predetermined ringing command for instructing the sub-telephones 5 to produce a ringing sound at a predetermined ringing pattern.

The ringing portion 28 is for producing a ringing sound. The CPU 20 controls the ringing portion 28 to produce a ringing sound at a predetermined ringing pattern.

The RF unit 22 includes the antenna 10 and is for performing wireless communication with the cordless telephones 5. The CPU 20 controls the RF unit 22 to wirelessly transmit the ringing command, in the form of a ringing command signal, to one or more desired sub-telephones 5.

The voice or speech recognition unit 23 is for recognizing verbally-inputted information, such as spoken words or keywords, through a well-known speech or voice recognition process, thereby recognizing or identifying the inputted spoken words.

The NCU 24 is connected to the analog telephone line 2 and is for performing communication with external communication devices 27 over the telephone line 2. Examples of the external communication devices 27 include: a caller's telephone or facsimile machine, and portable telephones and beepers, normally used by users of the cordless telephones 5, which will be described later.

The RAM 25 is a memory for temporarily storing a variety of data generated during execution of operations of the facsimile machine 1. The RAM 25 is divided into a variety of regions including: a transmission information storage region 25a for storing telephone selection information, process selection information, and external transmission information to be transmitted from the main telephone 4 to a caller; a ringing registration region 25b for registering data of the number of times the main telephone 4 is to be rung and data whether some cordless telephone 5 is to be rung when necessary; an answering machine recording region 25c for storing voice information for executing the answering machine function; a transmission message recording region 25d for storing callers' inputted voice messages to be transmitted to users' portable telephones or beepers; a transmission number registration region 25e for preregistering telephone numbers of the users' portable telephones and beepers; and a ringing pattern storage region 25f for storing data of a plurality of ringing patterns to be sounded in correspondence with a plurality of recognition patterns to be recognized by the voice recognition unit 23.

Figure 3:
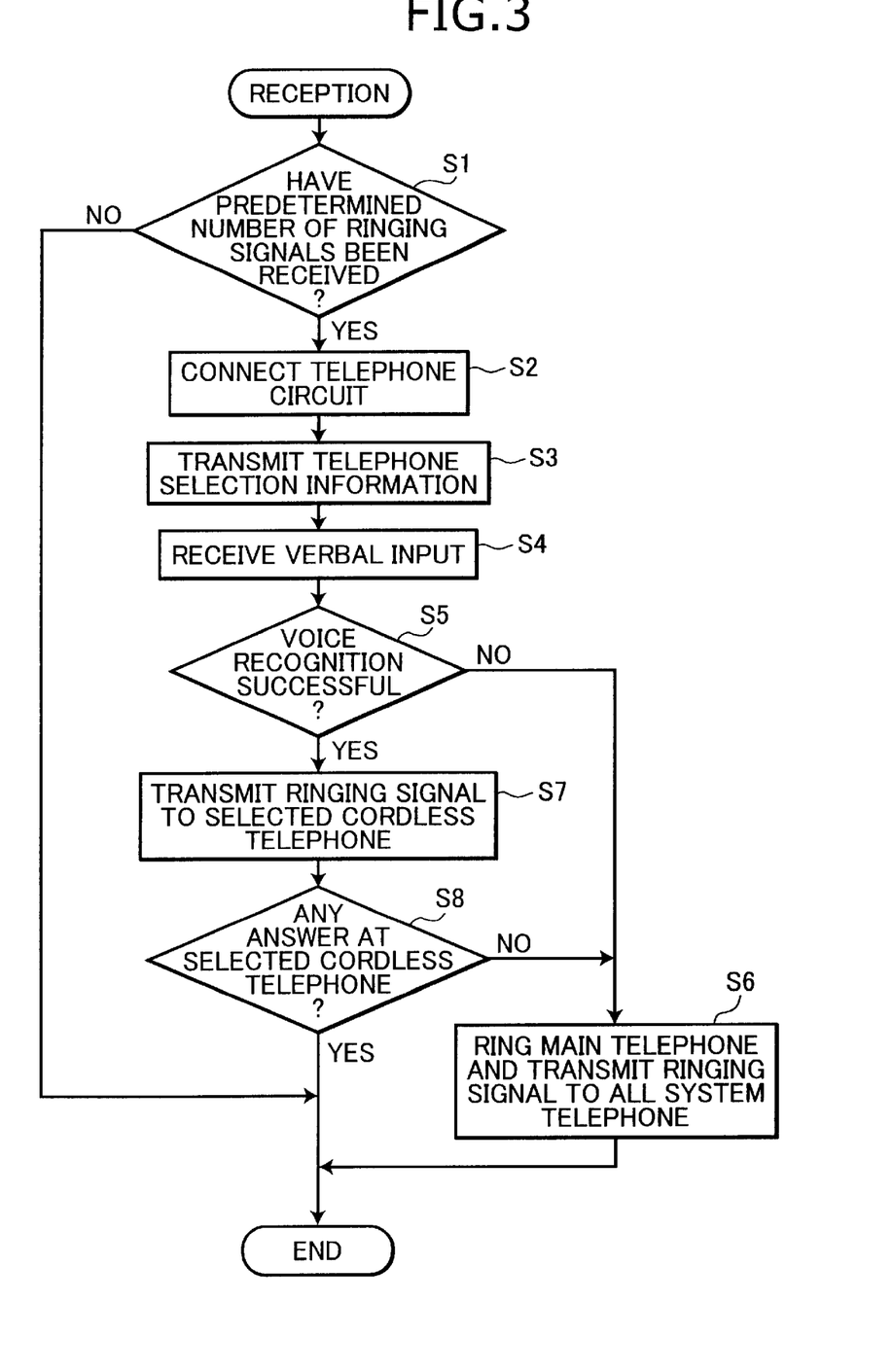
FIG. 3 is a flowchart representing an incoming call reception routine according to a first embodiment for sending telephone selection information to a caller and ringing a particular system telephone based on a caller's selection.

The ROM 26 stores therein a variety of data and control programs, such as an incoming call reception program of FIG. 3, to be executed by the CPU 20. As will be described later, the incoming call reception program includes; a selective ringing start up program (S1 of FIG. 3) for starting a ringing selection function; a telephone selection message transmit program (S3 of FIG. 3) for transmitting a message urging a remote caller to select one of the cordless telephones 5 to ring; a selective ringing program (S7 of FIG. 3) for ringing a cordless telephone 5 selected by the remote caller; a non-recognition program (procedure from S5 to S6 in FIG. 3) performed when the caller's verbally inputted information can not be is recognized; and a non-answered selective ringing program (procedure from S5 to S6 in FIG. 3) performed when selective ringing can not be answered.

As shown in FIG. 2, each cordless telephone 5 is provided with a ringing portion (ringing circuit) 15 for producing a ringing sound at the predetermined ringing pattern upon receipt of the predetermined ringing command signal. When the cordless telephone 5 receives the ringing command signal a plurality of times in succession, the ringing portion 15 repeatedly produces the ringing sound at the predetermined ringing pattern the same number of times.

With the above-described structure, the facsimile system of the present embodiment enables a caller, who operates a remote telephone or facsimile machine 27 and calls the present facsimile system 1 via the telephone line 2, to select his/her desired one of the system telephones 4 and 5 to ring.

That is, the facsimile system 1 operates in response to a call from a remote caller as shown in the flowchart of FIG. 3. More specifically, the CPU 20 starts executing the processes of FIG. 3 upon receiving a ringing signal over the telephone line 2 from a remote external device 27, which is connected to the facsimile machine 1 via the telephone line 2 and which will be referred to simply as "caller" hereinafter.

When a ringing signal is thus received from a caller, the CPU 20 determines in S1 whether or not a predetermined number of ringing signals has been received. Simultaneously executing this judgement of S1, the CPU 20 controls the ringing portion 28, provided in the main telephone 4, to ring in synchronization with the received ringing signals. Thus, only the main telephone 4 rings initially in response to the incoming call.

When the predetermined number of ringing signals has been received (S1:YES), then the CPU 20 controls in S2 the NCU 24 to connect the telephone line 2. On the other hand, when the predetermined number of ringing signals have not been received (S1:NO), the present process is ended. That is, this routine is ended without transmitting a telephone selection message (to be described later) to the caller when the caller hangs up the telephone at his/her end, or the call-receiving party picks up the handset 9 of the main telephone 4 before the predetermined number of ringing signals have been received. In this way, the facsimile machine 1 is controlled so as not to send telephone selection information to the caller until the predetermined number of ringing signals has been received over the telephone line 2. During the time from reception of the first ringing signal until the predetermined number of ringing signals are received, only the main telephone 4 is rung based on those ringing signals and, when no one picks up the main telephone 4, then an optional one of the cordless telephones 5 can be rung thereafter according to the caller's selection as described below.

Once the predetermined number of ringing signals have been received (S1:YES), then the CPU 20 controls in S2 the NCU 24 to automatically connect the telephone line 2. Afterward, in S3, the CPU 20 retrieves telephone selection information from the transmission information storage region 25a, and controls the NCU 24 to transmit the telephone selection information to the caller. The telephone selection information includes recorded data of a voice message for urging the caller to select one of the cordless telephones 5 to ring. For example, the recorded data can represent a voice message such as "What telephone do you wish to call?" Thus, in S3, the voice message data is transmitted to the caller via the connected telephone circuit 2.

In response to the message transmitted to the caller in S3, the caller verbally inputs a keyword for selecting one of the cordless telephones 5 in the manner urged by the telephone selection information message. For example, in response to the telephone selection information of "What telephone do you wish to call," the user will conceivably say "No. 1," "No. 2," and the like into the hand piece of his or her telephone in order to select a corresponding one of the cordless telephones 5. A signal representing the caller's voice is transmitted over the telephone line 2 and is inputted in S4 into the main telephone 4 via the NCU 24.

Then, in S5, the CPU 20 controls the voice recognition unit 23 to attempt to recognize the caller's inputted voice signal (caller's spoken keyword) according to the well-known speech recognition process, and judges whether or not the recognition unit 23 successfully recognizes the caller's voice signal. If the recognition unit 23 is unsuccessful for some reason, for example, when the caller does not say a specific recognizable keyword or says nothing (S5:NO), then in S6 the CPU 20 produces the predetermined ringing command, and controls the RF unit 22 to transmit the ringing command, as a ringing command signal, to all of the cordless telephones 5. Simultaneously, the CPU 20 also controls the ringing portion 28 to ring. Upon receipt of the ringing command signal, the ringing portions 15 in all the cordless telephones 5 ring. As a result, all of the system telephones, that is, the main telephone 4 and all of the cordless telephones 5, ring so that a person nearest any of the system telephones can answer the incoming call by picking up one of the system telephones. It is noted that in S6, the CPU 20 repeatedly performs the ringing control operation to control the RF unit 22 to transmit the ringing is command to all the cordless telephones 5 and to control the ringing portion 28 to ring. The CPU 20 repeatedly performs this ringing control operation until someone picks up some telephone 4, 5 or until the caller hangs up the telephone at his/her end.

On the other hand, when the recognition is successful (SS:YES), then in S7 the CPU 20 produces the predetermined ringing command and controls the RF unit 22 to transmit the ringing command, as a ringing command signal, to a specific cordless telephone 5 that is indicated by a result recognized by the recognition unit 23 as designated by the caller. Because the ringing command signal is transmitted only to the specific cordless telephone 5 in S7, only that cordless telephone 5 will ring so that the caller can call a certain person only corresponding to that cordless telephone. In other words, the caller can designate a specific cordless telephone 5 to ring so that no one else besides the person the caller wishes to talk to will answer the caller's call. Therefore, troublesome operations such as having to fetch the desired party and transferring the telephone call can be avoided. Further, because the caller selects the desired cordless telephone 5 verbally, that is, by saying "No. 1," "No. 2," and the like as directed by the telephone selection information message, operations are very simple and any caller can accurately call his/her desired one of the cordless telephones 5.

It is noted that in S7, the CPU 20 controls the RF unit 27 to repeatedly transmit the ringing command, as the ringing command signal, a predetermined number of times if a user of the caller's selected telephone 5 does not answer the subject telephone 5. Accordingly, the caller's selected telephone 5 will ring the predetermined number of times if the user does not answer the call.

Then, the program proceeds to S8, in which the CPU 20 judges whether or not a response is received from the caller's selected telephone 5 by the time the ringing command signal is transmitted to the selected telephone 5 the predetermined number of times. When no one picks up the selected telephone 5 to answer the call by the time the selected cordless telephone 5 has rung the predetermined number of times (no in S8), then the program proceeds to S6. As described above, in S6, the CPU 20 transmits the ringing command signal to all the telephones 5, while controlling the ringing portion 28, to ring. Thus, the main telephone 4 and all the cordless telephones 5 ring. Thus, if no one answers the caller's designated cordless telephone 5 (no in S8), the main telephone 4 and all the cordless telephones 5 will ring so that somebody can pick up any of the main telephone 4 and the cordless telephones 5.

Thus, as described above, according to the present embodiment, the facsimile machine 1 includes the main telephone 4 and the plurality of sub-telephones (cordless telephones) 5. The facsimile machine 1 transmits telephone selection information to the caller. Based on the telephone selection information, the caller then verbally selects one of the cordless telephones 5 to be rung. The voice recognition unit 23 analyses the caller's verbal input to determine the caller's selection. Based on the determination by the voice recognition unit 23, ringing command signals are transmitted to the cordless telephone 5 selected by the caller. With this configuration, only the cordless telephone 5 designated by the caller is rung. Because the user can select a cordless telephone 5 verbally, anyone can accurately let a particular cordless telephone 5 be rung without the need to perform complicated operations.

It should be noted that the facsimile machine 1 can be designed so that a caller can select in S4 more than one of the cordless telephones 5 at a time. Further, the main telephone 4 can also be selected. When the main telephone 4 is selected in S4, the CPU 20 controls the ringing portion 28 to ring in S7. When the main telephone 4 and one or more cordless telephone 5 are selected in 54, the CPU 20 controls the ringing portion 28 to ring, while transmitting ringing command signals to the selected telephone 5. Thus, one or more of the system telephones 4, 5 selected by the caller will be rung in S7.

[Second Embodiment]

The processes of the above-described first embodiment can be modified so that the telephone selection information be transmitted directly to the caller without allowing the main telephone 4 to initially ring in synchronization with the ringing signals transmitted from the caller.

In addition, according to the first embodiment, when the caller's selection is not properly recognized by the recognition unit 23 (no in S5) or when no one answers the caller's selected cordless telephone 5 (no in S8), all of the system telephones 4 and 5 are rung in S6. However, instead of all the system telephones being rung as in S6, a previously-set one or more system telephone 4, 5 may be automatically rung.

Figure 4:
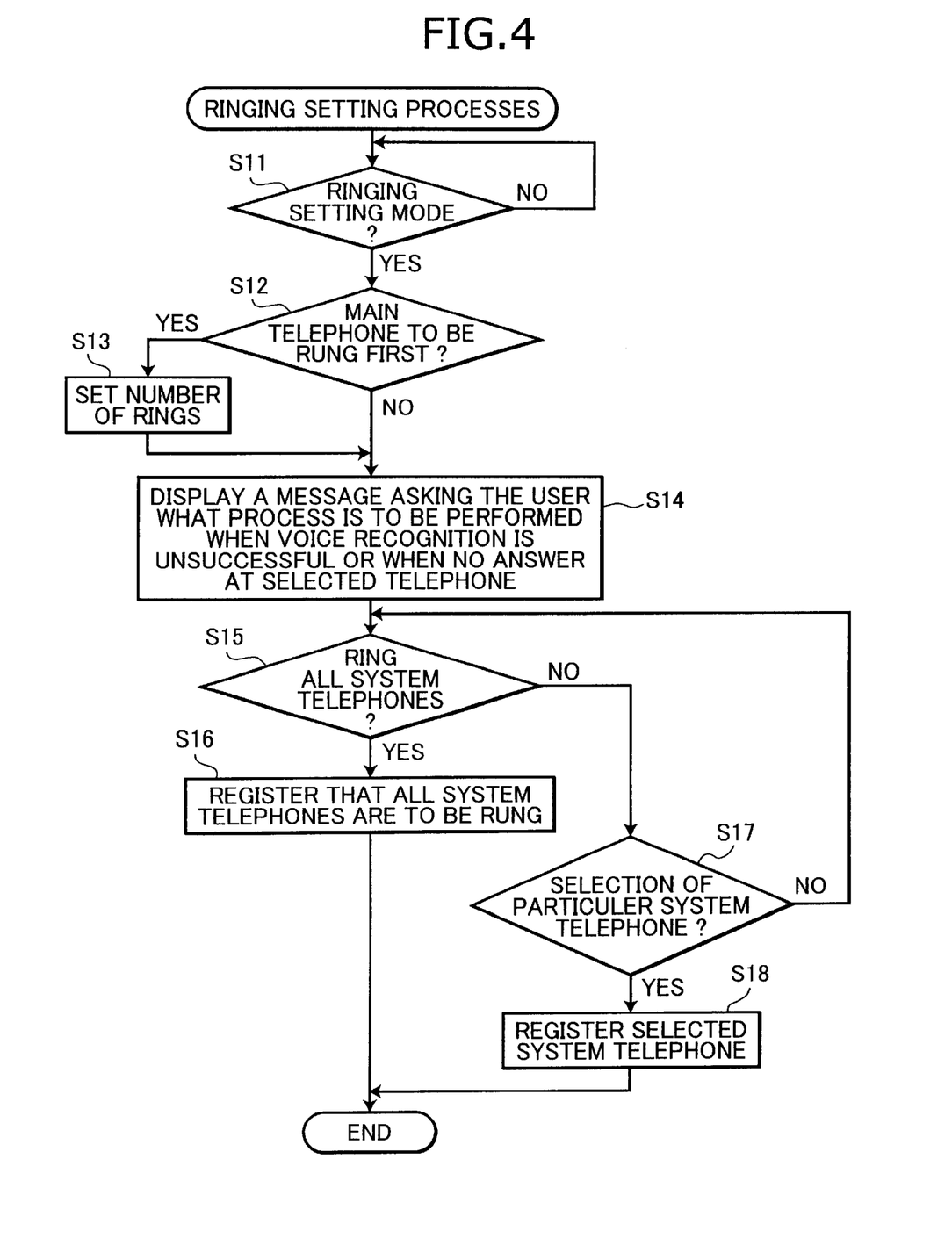
FIG. 4 is a flowchart representing a setting routine, according to a second embodiment, for presetting operations to be performed when an incoming call is received.

According to the present embodiment, a presetting process of FIG. 4 is performed for enabling a user of the present facsimile system 1 to previously set whether or not the main telephone 4 should be initially rung in response to an incoming call and to previously set some of the system telephones 4 and 5 to be automatically rung in S6. This routine is performed by executing a selection designation program stored in the ROM 26.

The presetting processes of FIG. 4 are started when the user of the present facsimile system 1 manipulates the operation portion 6 in a predetermined manner to select a ringing setting mode.

Figure 5:
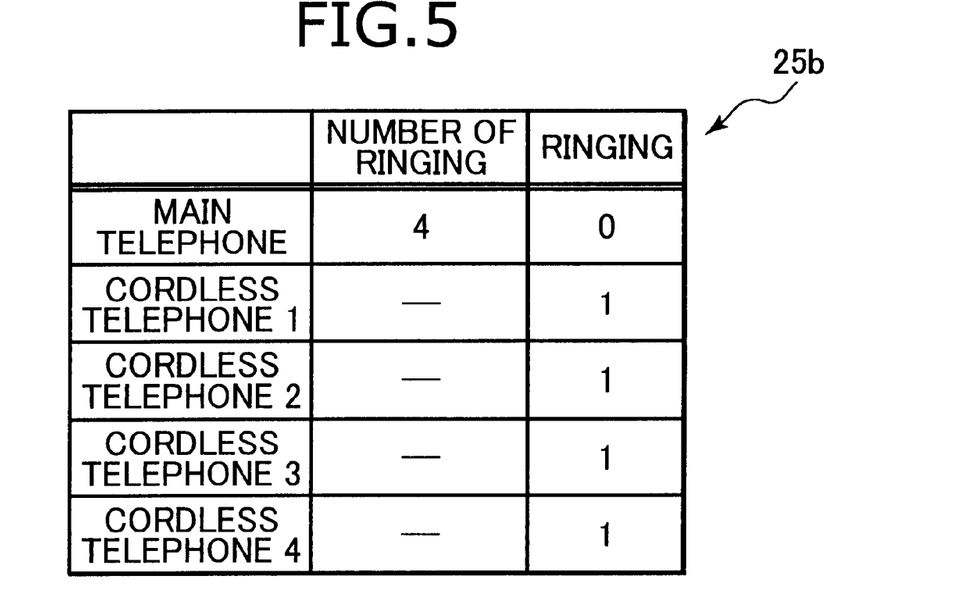
FIG. 5 is a chart representing data stored in a ringing registration region 25b of a RAM 25 in the facsimile machine of FIG. 1.

When the ringing setting mode is selected by the user's manipulation of the operation portion 6 (S11:YES), then the CPU 20 controls in S12 the LCD of the display portion 7 to display a message such as "Do you want the main telephone to ring first?". Viewing the message, the user operates the operation portion 6 to set whether or not he or she wishes the main telephone 4 to ring first automatically when a ringing signal is received. When the user sets to have the main telephone 4 ring first (S12:YES), then the CPU 20 controls in S13 the LCD of the display portion 7 to display another message such as "How many times do you want the main telephone to ring?". Viewing the message, the user manipulates the operation portion 6 to set the desired number of times he or she wishes the main telephone 4 to ring. The inputted number of ringing times is registered in the ringing registration region 25b of the RAM 25 as shown in FIG. 5. Then, the program proceeds to S14.

On the other hand, when the user indicates that he or she does not wish to have the main telephone 4 ring initially upon receipt of the incoming call (S12:NO), no data is registered in the ringing registration region 25b in correspondence with the main telephone 4. As a result, settings are performed so that the main telephone 4 will not be rung upon receipt of an incoming ringing signal, but the main telephone 4 will directly connect the telephone circuit 2 in S2 (FIG. 3) and transmit the telephone selection information to the caller in S3. Then, the program directly proceeds to S14.

Thus, the process of S14 is performed either after setting in S13 the number of times the main telephone 4 should ring or after setting in S12 that the main telephone 4 should not ring.

In S14, the CPU 20 controls the LCD of the display portion 7 to display another message asking the user what operation he or she wishes to have performed in S6 of FIG. 3 when the voice recognition unit 23 is unsuccessful in S5 in determining what the caller has verbally inputted or when no one answers in S8 the caller's selected cordless telephone 5. For example, the message is displayed on the LCD of the display portion 7 asking, "What operation do you wish to have performed when recognition of a caller's selection is unsuccessful or when no one answers a caller's selected cordless telephone?" Then, another message is displayed on the LCD of the display portion 7 asking, for example, "Do you want the main telephone and all the cordless telephones to ring?" Viewing this message, the user operates in S15 the operation portion 6 to select whether or not he or she wishes all of the main telephone 4 and the cordless telephones 5 to ring. When the user selects that he or she wishes all of the main telephone 4 and the cordless telephones 5 to ring (S15:YES), then in S16 this setting is registered in the ringing registration region 25b of the RAM 25. That is a ringing-On flag (number "1") is registered in the ringing registration region 25b for all the system telephones 4 and 5. In this case, during the incoming call receiving processes of FIG. 3, the process of S6 will be executed in the same manner as described in the first embodiment.

On the other hand, when the user indicates that he or she does not wish all of the main telephone 4 and the cordless telephones 5 to ring (S15:NO), then still another message is displayed in S17 on the LCD of the display portion 7 saying "Please select the system telephone you wish to have rung." Viewing this message, the user manipulates the operation portion 6 to input one or more system telephone(s) 4, 5 he or she wishes to have rung. Once the selection is made (S17:YES), then in S18, the selected system telephone(s) is registered in the ringing registration region 25b of the RAM 25.

It is now assumed that the user wishes all the cordless telephones 5 to have rung, but does not wish the main telephone 4 to have rung. In this case, as shown in FIG. 5, the ringing-On flag (number "1") is registered in the ringing registration region 25b for each cordless telephone 5, while the ringing-Off flag (number "0") is registered for the main telephone 4. Then, the setting process of FIG. 4 is ended.

On the other hand, when the user does not select any of the system telephones (S17:NO), then the routine returns to S15, whereupon the CPU 20 again controls the LCD of the display portion 7 to display the message. "Do you wish all of the system telephones to ring?".

When receiving an incoming call after the setting processes of FIG. 4, the CPU 20 executes the incoming call reception processes of FIG. 3 while properly modifying the processes based on the contents registered in the ringing registration region 25b. More specifically, If no data is registered for the main telephone 4 in the ringing registration region 25b, the process of S1 is omitted. Accordingly, the main telephone 4 is not rung first. Instead, the CPU 20 first performs the process of S2 to automatically connect the telephone line 2 and the process of S3 to transmit the telephone selection information to the caller, thereby allowing the caller to select his/her desired telephone to ring. Thus, the caller's selected telephone 4 or 5 will be rung first.

On the other hand, if some ringing number data is registered for the main telephone 4 in the ringing registration region 25b, the process of S1 is executed to allow the main telephone 4 to ring the registered ringing number of times in synchronization with the received ringing signals. The process of S1 is executed to judge whether or not ringing signals have been received the registered ringing number of times. If ringing number "4" is registered as shown in FIG. 5, the process of S1 is executed to allow the main telephone 4 to ring four times and to judge whether or not ringing signals have been received four times. After the main telephone 4 has rung four times, the telephone line 2 is connected in S2.

When recognition at the voice recognition unit 23 is unsuccessful (no in S5) or when no one answers the caller's selected cordless telephone (no in S8), the process of S6 is executed while referring to the ringing registration region 25b. If the ringing-Off flag (number "0") is registered for the main telephone 4 and the ringing-On flags (number "1") are registered for all the cordless telephones 5 as shown in FIG. 5, the CPU 20 transmits ringing command signals to all the four cordless telephones 5 so that those telephones 5 will be rung. The CPU 20 does not control the ringing portion 28 of the main telephone 4 to ring.

Thus, according to the present embodiment, by performing the setting operations of FIG. 4 before an incoming call is received as in FIG. 3, the user of the present facsimile system 1 can preset to have the main telephone 4 rung first before the cordless telephones 5. In this case, the user can preselect the number of times the main telephone 4 is to ring when a ringing signal is first received. Alternatively, the user can preset that the telephone line 2 be automatically connected and the caller's selected one of the main telephone 4 and the cordless telephones 5 is to be selectively rung without the main telephone 4 being rung first. Thus, initial processes to be performed when an incoming call is received can be optionally selected at the receiver's end through the setting processes of FIG. 4.

Further, the setting processes of FIG. 4 enable the user to preselect one or more system telephones to be rung when the voice recognition unit 23 is unsuccessful in recognizing the inputted verbal signal or when no one answers the caller's selected system telephone by the time that telephone is rung the predetermined number of times. Thus, the user can make preparations at his or her end to insure that all incoming calls be properly received. The manner how the user should receive incoming calls can be modified to more closely conform to the user's actual using state.

It is noted that the ringing pattern and/or a ringing tone sounded in S6 can be changed from the ringing pattern and/or a ringing tone produced in S7 at the caller's selected telephone. More specifically, the main telephone 4 may be designed as capable of producing and transmitting a plurality of types of ringing commands indicative of a plurality of ringing patterns and/or a plurality of ringing tones. Each cordless telephone 5 may be stored with data of the plurality of ringing commands in one to one correspondence with data of the plurality of ringing patterns and/or the plurality of ringing tones. In S7, the main telephone 4 transmits, to the caller's selected cordless telephone 5, some ringing command indicating some ringing pattern and/or some ringing tone. Accordingly, in S7, the caller's selected cordless telephone 5 rings according to the ringing pattern and/or ringing tone indicated by the ringing command. Contrarily, in S6, the main telephone transmits, to the user's preset telephone(s) 5, another ringing command that indicates another ringing pattern and/or another ringing tone. Accordingly, the user's preset telephone(s) 5 will ring in S6 at the ringing pattern and/or the ringing tone different from the ringing pattern and/or the ringing tone, at which the caller's selected telephone rings in S7. This advises the user that the telephone presently ringing in S6 is not the one desired by the caller to be initially rung and so enables the user to more easily handle incoming telephone calls.

In the above-described processes of FIG. 4, it is judged in S12 whether or not the main telephone 4 is to be rung first. However, the process of S12 can be modified to enable the user to select which of the system telephones 4, 5 should be rung first. The process of S13 can be modified to enable the user to set the number of times the selected telephones 4, 5 is to ring.

As described above, according to the present embodiment, when the setting operations represented by the flowchart of FIG. 4 are executed, data representing the number of times the main telephone 4 will be initially rung, a system telephone selected to be rung when the voice recognition is unsuccessful or when the caller's selected telephone is not answered, and the like is stored in the ringing registration region 25b of the RAM 25. During the incoming call reception processes of FIG. 3, the processes of S1 will be selectively executed in a manner according to the data stored in the ringing registration region 25b. The processes of S6 will be executed in a manner according to the data stored in the ringing registration region 25b. As shown in FIG. 5, the ringing registration region 25b is configured by flags that represent and manage information on settings set during the processes of FIG. 4 with respect to operations to be performed when a call signal is received, such as the number of times the main telephone 4 is to be rung, the system telephone or telephones to be rung when the voice recognition unit 23 is unsuccessful in recognizing the verbal signal or, when the verbal signal is recognized, the system telephone or telephones to be rung when no one answers the telephone selected by the caller. The ringing settings are represented by setting the flags to one or zero as shown in the chart of FIG. 5. As described above, in the example of FIG. 5, the main telephone 4 is set to ring four times. Also, all the cordless telephone 5 are set to ring (1) and the main telephone 4 is set not to ring (0) when voice recognition is unsuccessful or when the caller's selected telephone is not answered. According to these settings, when voice recognition is unsuccessful or when the caller's selected telephone is not answered, then a ringing command signal will be transmitted to all the cordless telephones 5.

[Third Embodiment]

According to the first embodiment, during the incoming call receiving processes of FIG. 3, when the caller's selection is not recognized (S5:NO) or when no one answers the caller's selected cordless telephone 5 by the time the predetermined number of ringing command signals are transmitted to that cordless telephone 5 (S8:NO), then in S6 all of the telephones 4, 5 are rung immediately. Contrarily, according to the present embodiment, when the caller's selection is not recognized (S5:NO), the predetermined telephone selection information is again transmitted to the caller. The caller is allowed to select a subsequent process when no one answers his/her selected cordless telephone 5 by the time the predetermined number of ringing command signals have been transmitted to that telephone.

Figure 6:
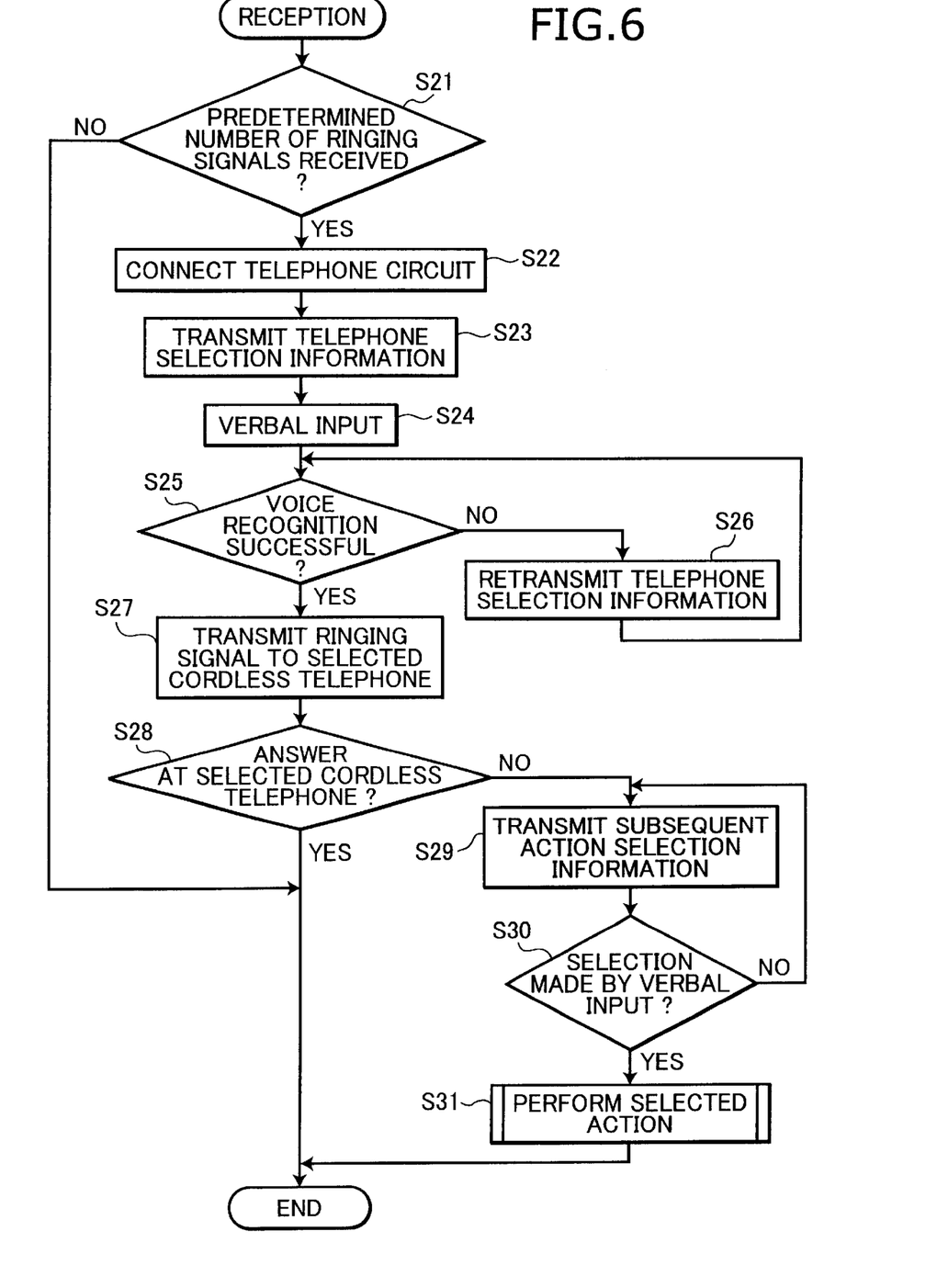
FIG. 6 is a flowchart representing an incoming call reception routine according to a third embodiment, wherein the telephone selection information is retransmitted to the caller when the caller's selection is not properly recognized and subsequent action selection information is transmitted to the caller when no one answers the caller's selected cordless telephone 5 by the time a predetermined number of ringing command signals is transmitted.

FIG. 6 shows the incoming call reception process according to the present embodiment. Data of the program for the incoming call reception process of FIG. 6 is stored in the ROM 26, and includes: a telephone selection information retransmission program (S26 in FIG. 6) performed when no selection from the caller is recognized; and a subsequent action selection program (529–S31 in FIG. 6) for enabling the caller to select a process to be performed when no one answers the caller's selected system telephone.

The processes of S21 to S24 in FIG. 6, that is, from when an incoming call is first received to when the caller's voice is received, are substantially the same as the processes of S1 to S4 in FIG. 3, and explanation thereof will be omitted.

After the processes of S21 through S24 are completed in the same manner as in S1–S4 of the first embodiment, the program proceeds to S25. In S25, the CPU 20 controls the voice recognition unit 23 to recognize the caller's verbally-inputted keyword, and judges whether or not the voice recognition unit 23 has succeeded recognizing the verbal signal inputted from the caller. If the voice recognition is unsuccessful (S25:NO), then the program proceeds to S26. In S26, the CPU 20 controls the NCU 24 to again transmit the telephone selection information to the caller. These processes are repeated in S25 and S26 until the caller's inputted verbal signal is successfully recognized. This enables the caller to reliably select his/her desired system telephone 5. Also, the caller will understand that his or her voice has not been understood so that the user will attempt to speak more clearly to facilitate understanding of his or her voice. In other words, the caller is warned when his or her voice is difficult to understand.

It should be noted that the processes of FIG. 6 can be modified so that the routine operation of S25 and S26 can be repeated only a predetermined limited number of times. After the routine operations of S25 and S26 are repeated the limited number of times, all of the telephones 4 and 5 may be rung as in S6 of the first embodiment or one or more previously-selected telephone 4 or 5 may be rung as in S6 of the second embodiment.

The presetting processes of FIG. 4 may be modified to enable the user to preset the limited number of times the routine operation of S25 and S26 can be repeated and to select one or more telephone to be rung after repetition of the routine operation of S25 and S26 the limited number of times.

When the caller's verbal signal is recognized (S25:YES), then the program proceeds to S27. In S27, in the same manner as in S7 (FIG. 3) of the first embodiment, the CPU 20 starts transmitting a ringing command signal to a cordless telephone 5 selected by the caller so that the caller's selected cordless telephone 5 will be rung. When no one answers the caller's selected cordless telephone 5 by the time the ringing command signal is transmitted to the telephone 5 the predetermined number of times (S28:NO), then in S29 the CPU 20 controls the NCU 24 to transmit subsequent action selection information to the caller. The subsequent action selection information is recorded data stored in the transmission information storage region 25a of the RAM 25 and is for representing a verbal message such as "There was no answer at your designated cordless telephone. Please select one of the following courses of action. 1. Ring all the telephones including the main telephone and the cordless telephones. 2. Select another cordless telephone. 3. Leave a message at your initially selected cordless telephone." Listening this message, the caller verbally inputs the number of his/her desired subsequent, course of action. Then, in S30 the CPU 20 controls the voice recognition unit 23 to attempt to determine what selection the caller has made. When the voice recognition unit 23 successfully determines the caller's selection (S30:YES), then in S31 the selected course of action is executed. When the user makes no selection or when the user's selection is not recognized (S30:NO), then the subsequent action selection information is again transmitted to the caller in S29. The routines of S29 and S30 are repeated until the caller properly makes a verbal selection of the subsequent course of action.

The process of S31 will be described below in greater detail.

It is assumed that the caller selects in S30 selection number one, i.e., that all the telephones including the main telephone 4 and the cordless telephones 5 to be rung. In this case, in S31, all of the telephones 4, 5 are controlled to be rung. That is, the CPU 20 transmits the ringing command signals to all the cordless telephones 5, while controlling the ringing portion 28 to ring. According to this control process, even when no one has answered the caller's selected cordless telephone 5 (no in S28) by the time the predetermined number of ringing command signals were transmitted thereto in S27, next all of the telephones 4 and 5 are rung so that the caller will at least be able to get through to someone. The above-described operation is attained through executing an entire telephone calling process program stored in the ROM 26.

It is also assumed that the caller selects selection number two, i.e., to select another cordless telephone 5 than the cordless telephone 5 that the caller has initially selected in S24. In this case, in S31, the processes from S3 to S7 in FIG. 3 are executed so that the caller can select another cordless telephone 5 to be rung. That is, the CPU 20 controls the NCU 24 to transmit the telephone selection information again to the caller in S3, whereupon in S4 the caller verbally inputs a selection of one of the cordless telephones 5 based on the telephone selection information. When the voice recognition unit 23 recognizes the selection of the caller (S5:YES), then in S7 the CPU 20 controls the RF unit 22 to transmit the ringing command signal to the presently-selected cordless telephone 5. Based on these processes, even when no answer is received at the caller's initially-selected cordless telephone 5 by the time the predetermined number of ringing command signals are transmitted thereto, then next, the caller has an opportunity to select another optional system telephone 5. Ringing command signals are transmitted to the selected system telephone as a result. Accordingly, even if the person the caller wishes to talk to most is not available or not at home, the caller can optionally call the next person he/she wishes to talk to. The above-described operation is attained through executing a specific telephone calling program stored in the ROM 26.

It is noted that the message number two may be modified to urge the caller to select his/her desired telephone from not only the telephones 5 but also from the main telephone 4. In this case, the caller can select the main telephone 4 in S30, and the main telephone 4 may be rung in S31.

It is also assumed that the caller selects in S30 selection number three, i.e., to leave his/her message at the cordless telephone he/she has initially selected in S24. In this case, in S31, the CPU 20 initiates the answering machine function of the facsimile machine 1. It is noted that the answering machine region 25c in the RAM 25 is provided with a plurality of separate regions for the respective cordless telephones 5. After selecting the selection number three, the caller leaves his/her verbal message. The caller's verbal message is recorded in a region corresponding to the cordless telephone 5 initially selected in S24 by the caller. A user that normally uses that cordless telephone 5 can learn why the caller has telephoned to the present facsimile system 1 by playing the recorded message from the caller. It should be noted that this reproduction process is performed by input of a specific password known by the user of the caller's selected cordless telephone 5. The above-described operation is attained through executing a recordation process program stored in the ROM 26.

According to the above-described control processes of the present embodiment, when no one answers the caller's initially-selected cordless telephone 5 by the time the predetermined number of ringing command signals are transmitted thereto (S28:NO), the caller is given an opportunity to select the subsequent course of action he or she wishes to pursue. Accordingly, even when no one answers the telephone, the caller can pursue the course of action most appropriate for that situation.

[Fourth Embodiment]

In the above-described incoming call reception processes of the third embodiment (FIG. 6), when no one answers the caller's selected cordless telephone 5 by the time the predetermined number of ringing command signals have been transmitted (S28:NO), then the subsequent action selection information is transmitted in S29 to the caller so that the caller can select the next course of action. Contrarily, according to the present embodiment, the process of S29 is modified so that the caller's message be automatically transmitted to a portable telephone or a beeper of a user who normally uses the caller's selected cordless telephone 5.

Figure 7:
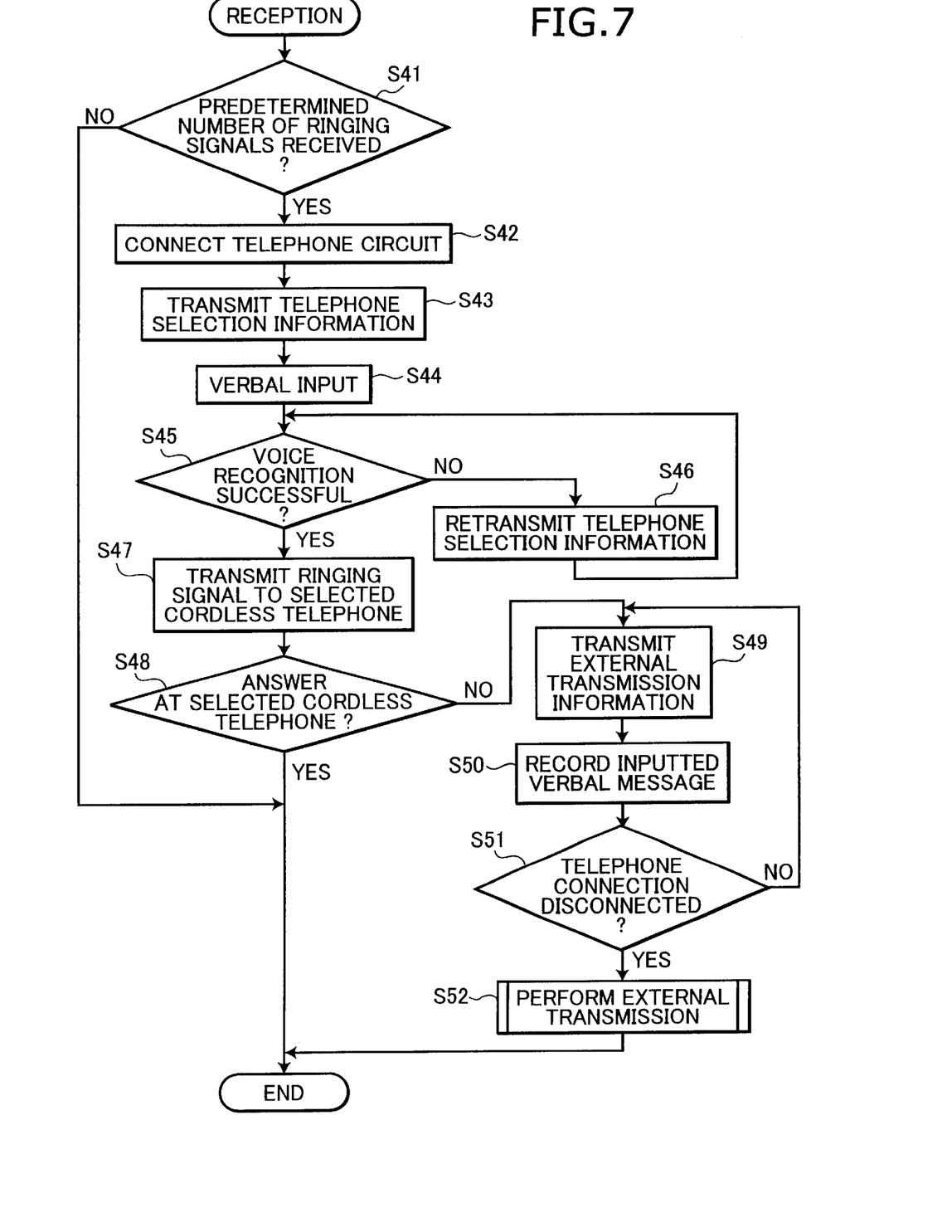
FIG. 7 is a flowchart representing an incoming call reception routine according to a fourth embodiment, wherein when no one answers the caller's designated cordless telephone by the time a predetermined number of ringing command signals have been transmitted, then the caller's message is automatically transmitted to a portable telephone or a beeper of a user who normally uses the caller's selected cordless telephone.

FIG. 7 shows the incoming call reception process of the present embodiment. It should be noted the program of FIG. 7 is stored in the ROM 26, and includes an external transmission program (S49–S52). Processes performed in S41 to S47 of FIG. 7, that is, from when an incoming call is first received to when ringing command signals are transmitted to the caller's selected cordless telephone 5, are substantially the same as the processes of S21 to S27 of FIG. 6, and their explanation will be omitted.

When no one answers the caller's selected cordless telephone 5 by the time the predetermined number of ringing command signals have been transmitted thereto (S48:NO), then the program proceeds to S49. In S49, the CPU 20 controls the NCU 24 to transmit external transmission information to the caller. The external transmission information is recorded data stored in the transmission information storage region 25*a* of the RAM 25. The external transmission information represents a voice message asking the caller to leave his/her message for being transmitted to an external communication device, such as a beeper or a portable telephone, that a user of the caller's selected cordless telephone possesses.

It is noted that the transmission number registration region 25*e* of the RAM 25 is preregistered with: data indicative of a kind of an external communication device (portable telephone or a beeper) 27 that a user of each cordless telephone 5 possesses; and a telephone number of the external communication device (portable telephone or beeper) 27. The registration in the transmission number registration region 25*e* is previously set by the user of each cordless telephone 5. In S49, the CPU 20 refers to the transmission number registration region 25*e* and determines the kind of the communication device (beeper or portable telephone) that the user of the caller's selected telephone possesses. When the caller's message is to be transmitted to a beeper, then a message such as "There was no answer at your selected cordless telephone. Please leave a message you wish to be transmitted to the party's beeper" is transmitted to the caller. On the other hand, when transmission is to be made to a portable telephone, then a massage such as "There was no answer at your selected cordless telephone 5. Please leave a message you wish to be transmitted to the portable telephone of the party" is transmitted to the caller.

Listening this message, the caller inputs his/her verbal message. Then, in S50 the CPU 20 records the inputted caller's verbal message in the transmission message recording region 25*d* of the RAM 25. Next, the CPU 20 controls the NCU 24 to disconnect the telephone line 2. Once the telephone connection between the caller and the facsimile machine 1 is disconnected (S51:YES), then in S52, the CPU 20 executes external transmission processes to transmit the recorded caller's message to the corresponding beeper or portable telephone. It is noted that the external transmission processes are executed while referring to the telephone number of the portable telephone or the beeper preregistered in the transmission number registration region 25*e* of the RAM 25.

The external transmission processes of S52 will be described below in greater detail.

For example, when the external transmission processes are executed to transmit the caller's message to a beeper, the CPU 20 may extract data of the caller's name from the message recorded in the transmission message recording region 25*d* and transmit data of the caller's name to the beeper. Alternatively, the CPU 20 may control the voice recognition unit 23 to recognize and analyze the message recorded in the transmission message recording region 25*d*, convert the message into a message signal corresponding to the beeper, and then control the NCU 24 to transmit the converted message signal to the beeper. The CPU 20 performs the above-described transmission operation according to a data format of services provided by the beeper.

On the other hand, when the external transmission processes are executed to transmit the caller's message to a portable telephone, the CPU 20 may control the NCU 24 to transmit the message recorded in the transmission message recording region 25*d* to the portable telephone as is.

According to the above-described processes of the present embodiment, when the caller's selected cordless telephone 5 is not answered because, for example, the user who normally uses the selected cordless telephone 5 is not at home, the caller's message can be transmitted to the user's beeper or portable telephone so that the user will immediately and reliably know that the caller has telephoned him/her so that the user can quickly contact the caller.

[Fifth Embodiment]

During the incoming call reception processes of the above-described embodiments of FIGS. 3, 6, and 7, each of the processes of S3, S23, and S43 is designed to transmit the telephone selection information to the caller, thereby asking the caller to verbally select his/her desired telephone 5 to ring. According to the present embodiment, each of the processes of S3, S23, and S43 is modified, according to a selective ringing pattern program stored in the ROM 26, so as to ask the caller to verbally input not only his or her selection of a particular cordless telephone 5 but also his or her personal name or organization name.

Figure 8:
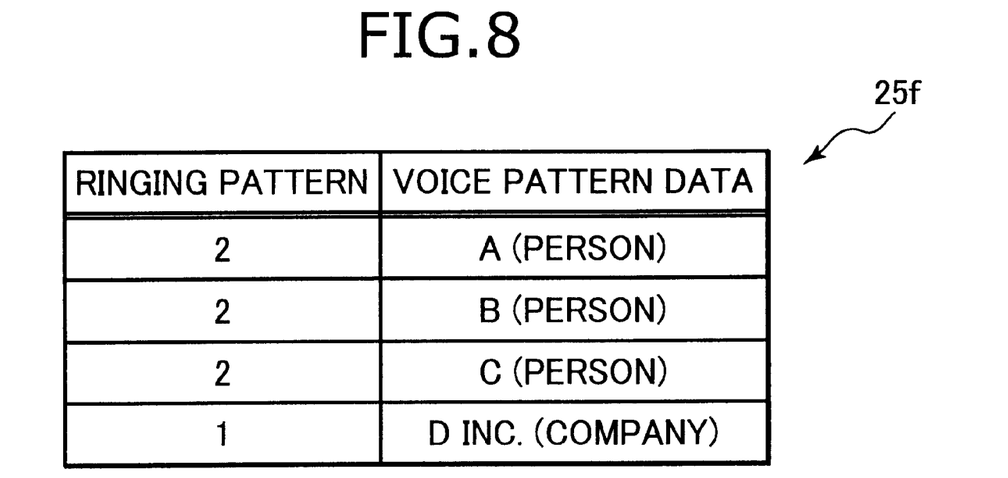
FIG. 8 is a chart representing data stored in a ringing pattern region 25f of the RAM 25 in the facsimile machine according to a fifth embodiment.

More specifically, according to the present embodiment, the ringing pattern storage region 25*f* of the RAM 25 is prepared in the form of a table shown in FIG. 8. As shown in FIG. 8, the ringing pattern storage region 25*f* stores either one of a plurality of ("two" in this example) different ringing patterns in correspondence with each of a plurality of ("four" in this example) sets of voice pattern data. Each set of ringing pattern data represents a ringing pattern that may be the same as or different from the predetermined normal ringing sound. Each voice pattern data represents name of a caller that will likely call the present facsimile system 1.

The ringing pattern data and the voice pattern data is stored in the ringing pattern storage region 25*f* before the incoming call reception processes are executed. The data is stored in the ringing pattern storage region 25*f* in a manner described below.

That is, the user of the facsimile machine 1 verbally inputs personal names or organization names of the plurality of callers that will likely call the present facsimile system 1. The inputted information is then converted by the CPU 20 into data and stored in the ringing pattern storage region 25*f* as the plurality of voice pattern data sets. The user then inputs data indicative of a ringing pattern that is desired to be rung for each of the inputted callers. The thus inputted ringing pattern data is stored in association with a corresponding set of voice pattern data. In the example of FIG. 8, a ringing pattern "1" is stored for a company, and another ringing pattern "2" is stored for each individual person. The CPU 20 is designed as capable of producing a plurality of ("two" in this example) different types of ringing commands in correspondence with the plurality of ringing patterns "1" and "2". Each of the cordless telephones 5 is stored with data of the plurality of ("two" in this example) ringing commands, to be received from the main telephone 4, in one to one correspondence with data of the plurality of ringing patterns "1" and "2".

When the caller inputs in S4, S24, or S44 selection of his/her desired cordless telephone 5 and his/her personal name or organization name, the voice recognition unit 23 analyses in S5, S25, or S45 the voice to recognize the inputted name and telephone selection. The voice recognition unit 23 refers to the plurality of voice recognition patterns stored in the ringing pattern storage region 25f, and judges whether or not the recognized name matches any of the plurality of voice recognition patterns or names. When the recognized pattern matches some voice recognition pattern in the ringing pattern storage region 25f, the process of S7, S27, or S47 is modified to transmit, to the caller's selected cordless telephone 5, a ringing command signal that represents a ringing pattern corresponding to the matched name. Receiving the ringing command signal, the caller's selected cordless telephone 5 produces a ringing sound at the ringing pattern indicated by the received ringing command signal. In the example of FIG. 8 during the process of S7, S27, or S47, the CPU 20 selects a ringing pattern "1" when the caller is a company and selects a ringing pattern "2" when the caller is an individual person. The CPU 20 transmits the ringing command of the type, that indicates the selected ringing pattern "1" or "2", to the caller's selected cordless telephone 5. The caller's selected cordless telephone 5 will ring at the selected ringing pattern "1" or "2". With this configuration, the user who answers the ringing cordless telephone 5 will have an understanding of who will be on the other end before he or she answers the phone. This is convenient for the user.

While the invention has been described in detail with reference to the specific embodiments thereof, it would be apparent to those skilled in the art that various changes and modifications may be made therein without departing from the spirit of the invention, the scope of which is defined by the attached claims.

For example, the above-described embodiments are directed to the facsimile system 1. However, the present invention need not be provided to a facsimile function. The present invention could be applied to a telephone without a facsimile function.

In the second embodiment, when the caller selects the main telephone 4 in S4 and the main telephone rings in S7, if no one answers the main telephone 4 (no in S8), the main telephone 4 will be rung in S6 if the main telephone 4 is preset to be rung through the presetting process of FIG. 4. In this case, the main telephone 4 may be controlled in S6 to ring in a ringing pattern and/or a ringing tone different from the ringing pattern and/or a ringing tone, at which the main telephone 4 rings in S7. More specifically, the CPU 20 may be designed as capable of producing a plurality of different ringing instructions for controlling the ringing portion 28 to ring at a plurality of different ringing patterns and/or a plurality of different ringing tones. When the CPU 20 controls the ringing portion 28 to ring at some ringing pattern and/or some ringing tone in S7, the CPU 20 may control the ringing portion 28 to ring at another ringing pattern and/or another ringing tone in S6.

In the third embodiment, the answering machine region 25c may be formed further with an additional separate region for the main telephone 4. When the caller selects the main telephone 4 in S24, but no one answers the main telephone (no in S28), if the caller selects the process in S30 to leave his/her message to his/her selected main telephone 4, the caller's message will be recorded in S31 in the region for the main telephone 4.

Similarly, in the fourth embodiment, the transmission number registration region 25e may be prestored further with data indicative of a kind of an external communication device (portable telephone or a beeper) that a main user of the main telephone 4 possesses; and a telephone number of the external communication device (portable telephone or beeper). When the caller selects the main telephone 4 in S44, but no one answers the main telephone (no in S48), information on the caller's call will be transmitted in S52 to the portable telephone or beeper that the main user of the main telephone 4 possesses.

In the fifth embodiment, when the caller selects the main telephone 4 in S4, S24, or S44, the main telephone 4 may be controlled to ring in a ringing pattern that corresponds to the caller's inputted name. More specifically, the CPU 20 may be designed as capable of producing a plurality of different ringing instructions for controlling the ringing portion 28 to ring at the plurality of different ringing patterns ("1" and "2" in this example) in correspondence with the plurality of different voice patterns shown in FIG. 8. When the caller's inputted name is recognized as matches with some voice pattern, the CPU 20 controls the ringing portion 28 to ring at a ringing pattern "1" or "2" that corresponds to that voice pattern.

In the above-described embodiments, the sub-telephones 5 are of the cordless type. However, the sub-telephones 5 may not be of the cordless type. The sub-telephones 5 may be powered by cords. In the above-described embodiments, the sub-telephones 5 are of a type that performs wireless telecommunication or radiotelephone communication with the main telephone 4. However, the sub-telephones 5 may not be of the wireless communication type. The sub-telephones 5 may be connected to the main telephone 4 via a wire. It is noted that each sub-telephone 5 is a telecommunication device that is not connected to the communication circuit, such as the commercial telephone line 2, and that is designed to perform telecommunication only with the main telephone 4. In the entire system 1, only the main telephone 4 is connected to the communication circuit 2. Each sub-telephone 5 can be located apart from the main telephone 4. Each sub-telephone 5 can communicate with a remote party only via the main telephone 4 that is connected to the remote party via the commercial telephone line.

What is claimed is:

1. A communication device, comprising:
 a plurality of telecommunication units, the plurality of telecommunication units including:
  a main telecommunication unit that is connected to a communication circuit and that can execute telecommunication with a caller and with which a user performs telecommunication over the communication circuit; and
  at least one subsidiary telecommunication unit that can communicate with the main telecommunication unit and that can execute telecommunication with the caller via the main telecommunication unit,
 the main telecommunication unit including:
  selection information transmission means for transmitting selection information to the caller via the communication circuit after the communication circuit is connected, the selection information being for urging the caller to verbally input information indicative of his/her desired telecommunication unit;

voice recognition means for recognizing the caller's verbally-inputted information;

selection calling means for selecting at least one telecommunication unit based on the recognized result and for transmitting a ringing signal to the selected telecommunication unit; and recognition failed time calling means for transmitting a ringing signal to either one of a user's previously-designated at least one telecommunication unit and all the telecommunication units when the voice recognition means fails to recognize the caller's verbally-inputted information.

2. A communication device as claimed in claim 1, further comprising selection designating means for allowing a user to previously designate the at least one telecommunication unit, to which ringing signal is to be transmitted by the recognition failed time calling means.

3. A communication device, comprising:

a plurality of telecommunication units, the plurality of telecommunication units including:

a main telecommunication unit that is connected to a communication circuit and that can execute telecommunication with a caller and with which a user performs telecommunication over the communication circuit; and at least one subsidiary telecommunication unit that can communicate with the main telecommunication unit and that can execute telecommunication with the caller via the main telecommunication unit, the main telecommunication unit including:

selection information transmission means for transmitting selection information to a caller via a communication circuit after the communication circuit is connected, the selection information being for urging the caller to verbally input information indicative of his/her desired telecommunication unit;

voice recognition means for recognizing the caller's verbally-inputted information;

selection calling means for selecting at least one telecommunication unit based on the recognized result and for transmitting a ringing signal to the selected telecommunication unit;

external transmission information transmission means for transmitting external transmission information to the caller via the communication circuit after the selection calling means transmits the ringing signals a predetermined number of times to the selected telecommunication unit, the external transmission information being for urging the caller to verbally input his/her message;

message recording means for recording the caller's verbally inputted message; and external transmission means for disconnecting the communication circuit, and for transmitting the recorded caller's message to an external communication device which is previously designated as corresponding to the selected telecommunication unit.

4. A communication device, comprising:

a plurality of telecommunication units, each telecommunication unit including a ringing portion capable of outputting a plurality of different ringing sounds, the plurality of telecommunication units including:

a main telecommunication unit that is connected to a communication circuit and that can execute telecommunication with a caller and with which a user performs telecommunication over the communication circuit; and at least one subsidiary telecommunication unit that can communicate with the main telecommunication unit and that can execute telecommunication with the caller via the main telecommunication unit, the main telecommunication unit including:

selection information transmission means for transmitting selection information to a caller via a communication circuit after the communication circuit is connected, the selection information being for urging the caller to verbally input information indicative of his/her desired telecommunication unit and his/her name;

voice recognition means for recognizing the caller's verbally-inputted information indicative of his/her desired telecommunication unit and his/her name;

ringing pattern storage means for prestoring data of the plurality of predetermined ringing patterns in correspondence with a plurality of predetermined recognition patterns;

selection ringing means for judging whether the caller's verbally-inputted information, indicative of the caller's name, recognized by the voice recognition means matches with one recognition pattern prestored in the ringing pattern storage means; and selection calling means for selecting at least one telecommunication unit based on the caller's verbally-inputted information, which is indicative of his/her desired telecommunication unit and which is recognized by the voice recognition means, and for transmitting, to the selected telecommunication unit, a ringing signal indicating a ringing sound that corresponds to the matched recognition pattern, the ringing portion in the selected telecommunication unit outputting the corresponding ringing sound in response to the received ringing signal.

\* \* \* \* \*